April 8, 1930.  J. REID ET AL  1,753,941
MANUFACTURE OF CHAINS
Filed Aug. 10, 1926  2 Sheets-Sheet 1

Inventors:
James Reid
Albert M. Leahy
Carlton G. Lutts
by Owen W. Kennedy
Attorney April 8, 1930.  J. REID ET AL  1,753,941
MANUFACTURE OF CHAINS
Filed Aug. 10, 1926  2 Sheets-Sheet 2

Inventors:
James Reid
Albert M. Leahy
Carlton G. Lutts
By Owen W. Kennedy
Attorney.

Patented Apr. 8, 1930

1,753,941

UNITED STATES PATENT OFFICE

JAMES REID, OF WATERTOWN, ALBERT M. LEAHY, OF SOMERVILLE, AND CARLTON G. LUTTS, OF SALEM, MASSACHUSETTS; MARGARET SWAN REID EXECUTRIX OF SAID JAMES REID, DECEASED

MANUFACTURE OF CHAINS

Application filed August 10, 1926. Serial No. 128,448.

Our invention relates to the manufacture of chains, particularly heavy chains of the type employed for ships' cables, dredges and the like. According to our invention a chain is made up of a series of interlocking link sections, each forged and heat treated to obtain high tensile strength, and with each pair of mating link sections so locked together that the completed chain has a tensile strength very much greater than the tensile strength of chains composed of one piece welded or cast links, as heretofore manufactured. In the finished chain, the locked sectional links are practically indistinguishable from one piece links, so that the chain can be used with standard hoisting equipment. The above and other advantageous features of our invention will hereinafter more fully appear, reference being had to the accompanying drawings, in which—

Like reference characters refer to like parts in the different figures.

Figures 1, 2:
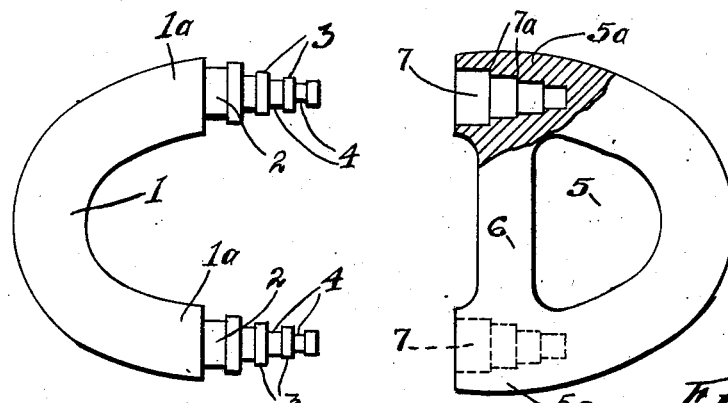
Fig. 1 is a view in plan of one type of link section employed in carrying out our invention.
Fig. 2 is a view in plan of the type of link section which mates with the link section shown in Fig. 1.

Referring to Fig. 1, one link section 1 is U-shaped in form with each leg 1ª terminating in a reduced portion 2. Each reduced portion 2 provides a series of collars 3, 3, which decrease in size toward the end of the portion 2, with reduced necks 4 therebetween. The link section 1 is forged complete with the collars 3, 3, from high grade steel, and the entire section 1 is preferably heat treated to give it a very high tensile strength.

The other link section 5, shown in Fig. 2, is preferably formed with a stud portion 6 connecting the legs 5ª, so that when the section 5 is joined to the section 1 in locking relation, as will be hereinafter described, the combined link sections 1 and 5 will provide a complete link of the stud type. The link section 5 is forged complete from high grade steel and after the forging the end faces of the legs 5ª on opposite sides of the stud portion 6 are provided with recesses 7, 7. The recesses 7 are stepped to provide shoulders 7ª, gradually decreasing in diameter, the recesses 7 being formed either by punching, while the metal is hot, or by drilling, when the metal is cold. The end faces of the recessed legs 5ª are somewhat greater in diameter than the unreduced diameter of the legs 1ª at the bases of the largest neck 2. After a link section 5 has been so formed, the portion thereof beyond the recess 7 is heat treated to give it a strength substantially equal to the strength of the entire link section 1.

Figure 4:
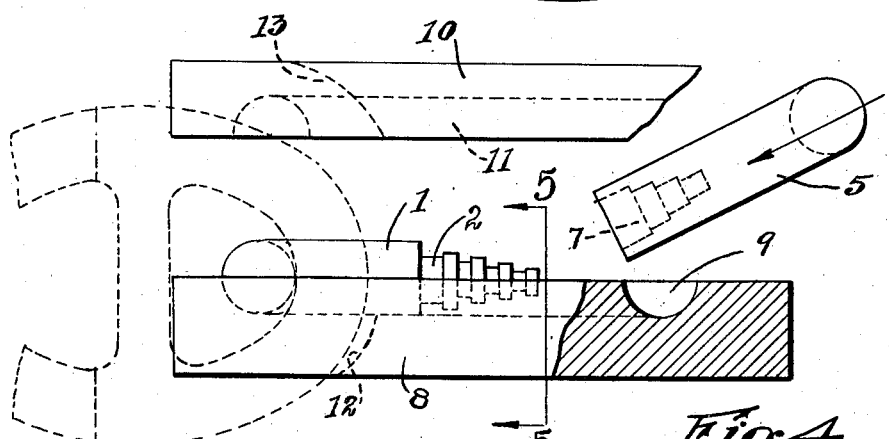
Fig. 4 is a side view partially in section, of the dies employed in pressing the link sections in locking relation.
Figure 5:
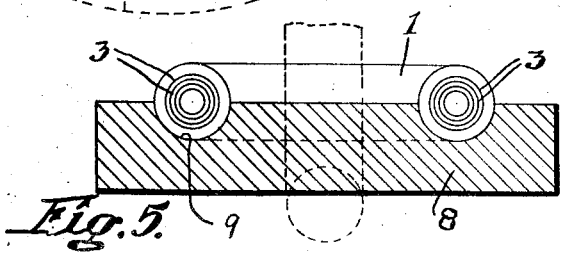
Fig. 5 is a section along the line 5—5, of Fig. 4.

In locking a pair of link sections 1 and 5 together to form a complete link, the section 1 is first placed, cold, in a suitable die 8, which as shown in Fig. 4, provides a continuous depression 9 for receiving the lower half of the section 1. The depression 9 is also adapted to receive the lower half of a link section 5 when the latter is placed in the die 8, in the manner indicated at Fig. 4, to cause the collars 3 and necks 4 to enter the recesses 7. Before placing the link section 5 in the die 8, those portions of the section 5 around the recesses 7 are heated to a high temperature, and immediately after the section 5 is received in the die 8, a second die 10 is brought to bear upon the lower die 8 and the two link sections therein.

Figure 3:
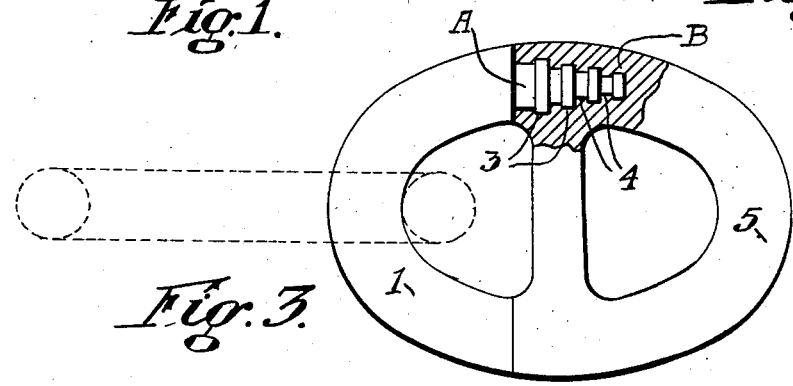
Fig. 3 is a plan view showing the link sections of Figs. 1 and 2 locked together.

As shown in Fig. 4, the upper die 10 provides a depression 11 for receiving the upper half portions of the assembled link sections 1 and 5; consequently when the dies 8 and 10 are brought together the hot and somewhat plastic metal surrounding the recesses 7 will be quickly forced around the cold metal collars 3 into contact with the neck portions 4 between the collars 3. It is evident from Figs. 1 and 2 that the several inside diameters of the recesses 7 are substantially the same as the several outside diameters of the collars 3, so that with the hot plastic metal confined on all sides, the pressure of the dies causes the metal surrounding the recesses 7 to flow into annular spaces surrounding the neck portions 4 to securely lock the link sections 1 and 5 together, as shown in Fig. 3. The excess metal in the shell surrounding the recesses 7 resulting from the larger diameter of the legs $5^a$ as compared to the legs $1^a$, insures that spaces around the reduced portions 4 will be completely filled in the final joint as shown in Fig. 3.

As previously pointed out, the shell of metal surrounding each recess 7 is heated to a high temperature, and where this heated metal comes into contact with the cold metal of the collars 3 and the dies 8 and 10, the shell will be tempered, at the same time that the metal is forced around the collars 3. By heating the recessed portions of a link section 5 to a predetermined degree, we have been able to obtain in the shell portions of a finished link, substantially the same degree of temper as in the reduced collared portions 2. As a result, when a pair of link sections 1 and 5 are united as described above, the jointed portions will have a tensile strength almost as great as the tensile strength of the unjointed portions.

It is to be particularly noted that the completed link of Fig. 3 offers a smooth outside contour over the joints with no bulges that would interfere with the use of the chain in passing over standard pulleys and other mechanical equipment with which the chain might be used. This smooth contour is made possible by the fact that in our joint the largest collar is less in diameter than the unreduced stock from which links are formed. We have found that this reduction in area, however, does not materially lessen the ultimate breaking point of the chain, since a solid link would break at a point near an end of the link, between its legs, rather than at a point in one of the legs where the axial pull on a link is divided between the legs. Consequently we have calculated the area of the locking collars such that the link will break at the joint at approximately the same strain that a solid link would break near its end.

By actual tests, we have found that locked links made from stock one inch in diameter will fracture at approximately the points A or B with a breaking load that is over 80% of highest breaking load obtainable with a piece of material also one inch in diameter and unjointed. We have also found that locked link chains embodying our invention show a tensile strength from 50% to 100% greater than chains as heretofore manufactured.

When a complete locked link has been made, as described above, the next link of the chain is formed by passing another U-shaped section 1 through the opening at one end of the locked link and then placing the locked link in a vertical slot 12 provided in the lower die 8, as shown in Fig. 4. The upper die 10 is provided with a similar slot 13, so that the locked link in no way interferes with die pressing and locking the mating link sections in the dies. Obviously, the procedure is the same for each succeeding link until a chain of the desired number of locked links is obtained.

Figure 6:
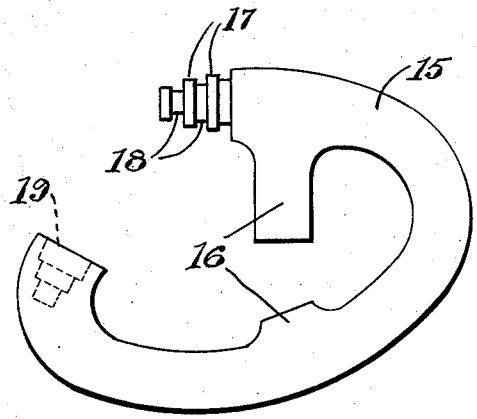
Fig. 6 illustrates our invention applied to a modified form of locking link which is shown in an open condition.
Figure 7:
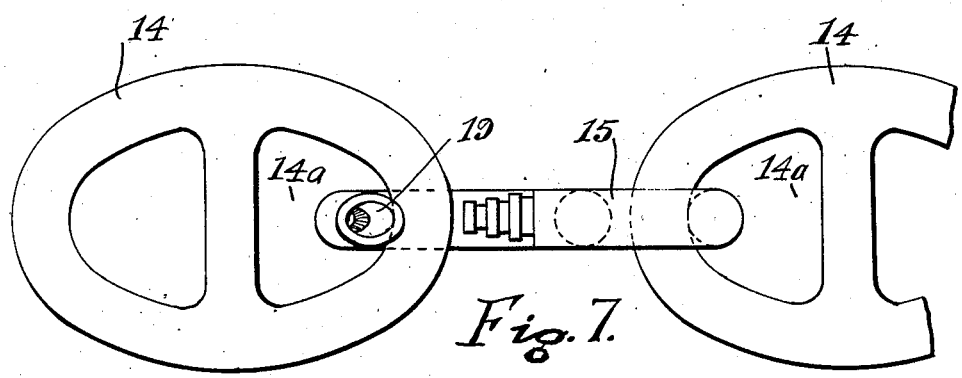
Fig. 7 is a side view showing the locking link of Fig. 6 with solid links inserted at either end thereof.
Figure 8:
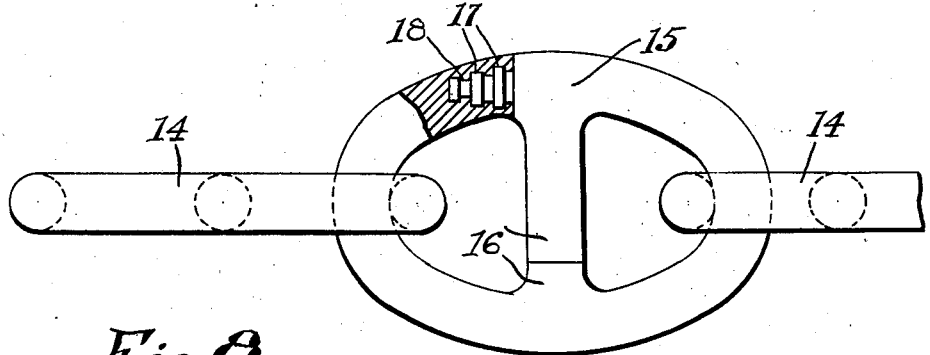
Fig. 8 shows the locking link closed.

Referring now to Figs. 6, 7 and 8, our invention is shown as being applied to one piece locking links that are employed to connect solid links to form a complete chain. As shown in Fig. 7, the modified chain comprises a standard type of solid links 14, which may be formed in any usual manner, as by drop forging, between which are interposed locking links 15. The locking links 15 are drop forged in the form shown in Fig. 6, one end of each link 15 being entirely open, with the stud formed in two spaced parts 16, 16, while at one side of the opening collars 17 and reduced neck portions 18 are forged solid with the link. The next operation on a locking link 15 consists in punching or boring a recess 19 in the open end portion opposite the collars 17, after which the locking link 15 is ready to be joined to the solid links 14, it being noted that the original cross sectional area of the recessed end is greater than the cross sectional area at the base of the largest reduced portion 18.

The locking link 15 of Fig. 6 is then slipped through a hole $14^a$ of the solid link 14, and the latter is moved to the unbroken end of the link 15. Then, with the aid of a suitable press, the spaced stud portions 16, 16, are forced together. The chain parts are shown in this position in Fig. 7, a second solid link 14 being shown on the left, as having been received in the then partially opened link 15.

The final steps in the manufacture of a length of chain consists in closing the link 15 and in locking the collars 17 in the recess 19 by hot swaging the metal around the collars 17 into contact with the portions 18. When this has been done, there is no possibility of the locked portions of the link 15 coming apart, the link 15 then being practically as strong as the solid links 14. Three assembled links of a chain are shown in Fig. 8, from which, it will be seen that all the links present practically the same appearance. Obviously, the above described operations are carried on with respect to succeeding locking links 15 and solid links 14 until a chain of the desired length is obtained.

In certain sizes of links, it is necessary to make the break between the stud portions 16 nearer one side of the link 15, as shown in the several views, in order to freely pass the link through the solid links 14. However we do not restrict ourselves to this mode of manufacture, as in certain sizes of chain the stud portions 16 may be separated exactly along the center of the link. It will also be apparent that the relative positions of the collars 17 and of the recess 19 may be interchanged without affecting the principal of the locking link 15.

From the foregoing, it is apparent that by the practice of our invention, chains can be manufactured that will be stronger than any chains of the same size heretofore produced. Furthermore, various modifications in the details of manufacture can be carried out, without in any way departing from our invention; for example, the exact form of the interlocking portions of the link sections can be varied, and obviously the entire chain can be composed of forgeable metals other than high grade steel.

It is also obvious that our invention is not confined to the use of stud chain links; on the contrary, our locking principle can be applied to any type of link. Briefly stated, the essential principle of our invention resides in an improvement in the manufacture of two-part chain links by the practice of which each completed link is of uniform thickness from end to end, with a rounded outer contour entirely devoid of protuberances adjacent the joints between the link sections, so that chain made from such links is capable of universal application to standard hoisting equipment.

We claim:

1. The process of manufacturing chain links which consists in providing complementary link sections, one having a reduced portion and the other a heated recessed portion and then uniting said complementary reduced and recessed link portions by contracting the heated plastic metal of the recessed portion into locking engagement with the inclosed cold metal of the reduced portion by a single die pressing operation serving to uniformly compress the entire surface of said recessed link portion and thereby provide a completed link of uniform thickness from end to end, with a rounded outer contour entirely devoid of protuberances over the joint between said link sections.

2. The improvement in the manufacture of chains which consists in providing two link sections, one having a reduced portion providing collars all of less diameter than the body of the section and the other a heated recessed portion, then inserting said reduced portion into said recessed portion and finally, in a single operation, contracting said heated recessed portion uniformly about said reduced portion to cause the heated metal to be forced around the collars at said reduced portion to lock the link sections together, thereby providing a completed link presenting a smooth rounded outer contour from end to end with the joint between the link sections having a uniform transverse cross-sectional area which is substantially the same as the cross-sectional area of the unjointed portions of the link at any transverse section taken outwardly from the inner contour of the link opening.

3. The improvement in the manufacture of chain links which consists in providing complementary substantially U-shaped sections, one of which provides reduced portions at the ends of its legs and the other of which provides an integral stud extending between the legs thereof, with recesses on opposite sides of the stud, then inserting said reduced portions into the recesses of the heated stud section and finally, in a single operation, contracting the recessed portions of the stud section uniformly about the reduced portions of the other section to cause the heated metal to be forced around the reduced portions to lock the link sections together, with the outer contour of the complete link entirely devoid of protuberances, and with the joints between the sections of substantially the same cross-sectional area as the body of the sections, except where the stud joins the recessed portions in the vicinity of the joints.

JAMES REID.
ALBERT M. LEAHY.
CARLTON G. LUTTS.